Patented Aug. 2, 1949

2,477,978

UNITED STATES PATENT OFFICE 2,477,978

3,4-DICHLORO-1-(α-CHLORO-β-TRI-CHLOROETHYL)-BENZENE

Charles Graenacher, Riehen, and Paul Streuli, Max Geiger, and Eduard Usteri, Basel, Switzerland, assignors to Ciba Limited, Basel, Switzerland, a Swiss firm No Drawing. Application May 14, 1947, Serial No. 748,122. In Switzerland May 17, 1946

1 Claim. (Cl. 260—651)

According to this invention 3:4-dichloro-1-tetrachlorethyl-benzene of the formula

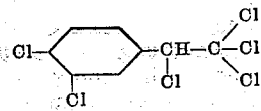

is made by condensing ortho-dichlorobenzene with chloral or condensing 3:4-dichlorobenzaldehyde with chloroform, and exchanging the hydroxyl group in the resulting carbinol for a chlorine atom.

The product, which may more specifically be termed 3:4-dichloro-1-(α-chloro-β-trichlorethyl)-benzene, is a water-clear oil having a feebly aromatic odour and boiling at 172–175° C. under 11 mm. pressure.

The condensation of ortho-dichlorobenzene with chloral is conducted in the presence of a condensing agent, advantageously anhydrous aluminium chloride; and the condensation of 3:4-dichloro-benzaldehyde with chloroform is conducted in the presence of a caustic alkali, especially caustic potash, and advantageously in an anhydrous medium. The conversion of the carbinol into the corresponding chloro-compound may be brought about by treatment with an inorganic chloride capable of exchanging an aliphatic hydroxyl group for a chlorine atom, for example, a phosphorus chloride, advantageously phosphorus pentachloride or thionyl chloride.

The product of the invention is a remarkably suitable agent for combating animal pests. It acts on the various stages in the development of the pests, for example, as a contact, stomach or respiratory poison.

It can be used for protecting a very wide variety of things against pests, and gaseous or liquid or solid substances may be used as carriers for the active substance. As things to be protected or to be used as carriers there come into consideration, for example, the air, especially in rooms, and liquids, for instance water in ponds, and finally any living or non-living solid substratum, for instance, the objects in living-rooms, in cellars, on plaster floors or in stables, also pelts, feathers, wool and the like as well as living organisms of the vegetable and animal kingdoms in their very wide variety of states of development, provided that they are not sensitive to the pest-combating agent.

The pests are combated by the usual methods by treating the thing to be protected with 3:4-chloro-1-(α-chloro-β-trichlorethyl)-benzene in the form of vapour or of a spraying or dusting preparation. Solutions or suspensions in water or in suitable organic solvents, for example, alcohol, petroleum, tar distillates and others, or aqueous solutions or aqueous emulsions of organic solvents may be used for brushing, spraying or dipping the objects to be protected. They may also be dusted without causing materially injurious effects on warm blooded animals. In order to enhance the wetting and adhering capacity there may be added the usual wetting agents, for example, butyl-naphthalene sulfonic acid, fatty alcohol sulfonates and the like, and adhering agents, for example, hardenable aminoplasts, among which hardenable carbamide or melamine resins soluble in water or of restricted water-solubility are included. If desired, there may also be added inert filling materials or identifying materials, for example, kaolin, gypsum or bentonite, or other additions such as sulfite cellulose waste liquor, cellulose derivatives and the like.

The 3:4-dichloro-1-(α-chloro-β-trichlorethyl)-benzene may also be used in admixture with other pest-combating agents.

The insecticidal activity of 3:4-dichloro-1-(α-chloro-β-trichlorethyl)-benzene will be clearly understood from the following data:

I. PROLONGED CONTACT

The test animals were brought into contact with an accurately dosed coating in Petri dishes of 10 centimeters diameter, and continuously observed. The coating was prepared by placing an ethereal solution of the active substance in the dish and allowing the solvent to evaporate.

(a) Results with 0.1 milligram of the active substance per square centimeter

|  | 15 mins. | 1 hour | 3 hours | 6 hours | 24 hours | 48 hours |
|---|---|---|---|---|---|---|
| Musca domestica | ⊕ |  |  |  | + |  |
| Calliphora erytrocephala | ⊕ |  |  |  | + |  |
| Tinea granella |  | ⊕ |  |  | + |  |
| Gnathocerus cornutus |  |  | ⊕ |  | + |  |
| Phyllodromia germanica |  |  |  | ⊕ |  | + |
| Lasius fuliginosus |  |  |  | ⊕ | + |  |
| Liposcelis divinatorius |  | ⊕ |  |  | + |  |

(b) Tests on flies with weak coatings
Test animals: *Musca domestica*

| Coating | 15 Minutes | 24 hours |
|---|---|---|
| 0.1 milligram per square centimeter | ⊕ | + |
| 0.05 milligram per square centimeter | ⊕ | + |
| 0.01 milligram per square centimeter | ⊕ | + |
| 0.001 milligram per square centimeter | ⊕ | + |

II. BRIEF CONTACT

Test animals: *Musca domestica*
0.1 milligram of the active substance per square centimeter.

The animals were subjected for a limited period to the action of the coating, and subsequently observed in clean dishes.

| Period of contact | 1 hour | 24 hours |
|---|---|---|
| 30 minutes | ⊕ | + |
| 15 minutes | ⊕ | + |
| 5 minutes | ⊕ | + |
| 2 minutes | ⊕ | + |
| 1 minute | ⊕ | + |

In the foregoing tables: ⊕=animals paralysed and lying on their backs, +=animals killed.

The following examples illustrate the invention, the parts being by weight unless otherwise stated, and the relationship of parts by weight to parts by volume being the same as that of the kilogram to the liter:

EXAMPLE 1

240 parts of anhydrous aluminium chloride are introduced in small portions with the exclusion of moisture in the course of 5 hours into a solution of 270 parts of anhydrous chloral in 1350 parts of dry ortho-dichlorobenzene, while stirring. The reaction temperature is maintained at 0-5° C. by cooling in an ice bath. After the whole of the aluminium chloride has been introduced, the mixture is stirred for a further 12 hours at 0-5° C., the reaction mixture is then mixed with ice-water and dilute hydrochloric acid, and the dichlorobenzene solution is separated and thoroughly washed with water and dried. The excess of dichlorobenzene is then removed by distillation under reduced pressure, and the dark oil which remains behind is then fractionated under greatly reduced pressure. 3 : 4 - dichloro - 1 - (α-hydroxy-β-trichlorethyl) - benzene is obtained in good yield in the form of a viscous oil boiling at 153–154° C. under 0.06 mm. pressure.

450 parts of the carbinol so obtained are dissolved in 1000 parts by volume of ether, and then 340 parts of phosphorus pentachloride are slowly introduced, while stirring, and with the exclusion of moisture. The reaction temperature is maintained at 0–15° C. by means of an ice bath. When the whole of the phosphorus pentachloride has been introduced and the evolution of hydrogen chloride has ceased, first the ether and then the phosphorus oxychloride formed are removed by distillation. The residual oil is well washed first with a dilute aqueous solution of sodium carbonate and then with water. After being dried, the oil is fractionated over 10 parts of solid sodium carbonate under reduced pressure. A good yield of 3:4-dichloro-1-(α-chloro-β-trichlor-ethyl)-benzene is obtained in the form of an oil with a feebly aromatic odour and having a boiling point of 172–175° C. under 11 mm. pressure.

EXAMPLE 2

20 parts of finely powdered dry potassium hydroxide are introduced in small portions into a solution of 174 parts of 3:4-dichlorobenzaldehyde in 120 parts of dry ether and 110 parts of dry chloroform in the course of 4 hours, while stirring, and with the exclusion of moisture. The reaction temperature is maintained at 15–20° C. by external cooling. When the whole of the potassium hydroxide has been introduced, the mixture is stirred for a further 12 hours at 20° C. and then allowed to stand for 48 hours. The reaction mixture is then mixed with ice-water, and the ethereal layer is separated, washed neutral with water, dried, and the ether is removed by distillation. The oil which remains behind is fractionated under greatly reduced pressure. A good yield of 3:4-dichloro-1-(α-hydroxy-β-trichlorethyl)-benzene is obtained in the form of a clear oil boiling at 153–154° C. under 0.06 mm. pressure.

450 parts of the carbinol so obtained are dissolved in 1000 parts by volume of ether, and then 325 parts of phosphorus pentachloride are slowly introduced while stirring and with the exclusion of moisture. The reaction temperature is maintained at 0–15° C. by cooling in an ice bath. When the whole of the phosphorus pentachloride has been introduced and the evolution of hydrogen chloride has ceased, first the ether and then the phosphorus oxychloride formed are removed by distillation. The residual oil is well washed first with a dilute aqueous solution of sodium carbonate and then with water, dried, and fractionated under reduced pressure. A good yield of 3:4-dichloro-1-(α-chloro-β-trichloroethyl) - benzene is obtained in the form of a water-clear oil boiling at 172–175° C. under 11 mm. pressure.

What we claim is:
3:4-dichloro-1-tetrachlorethyl-benzene of the formula

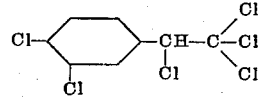

CHARLES GRAENACHER.
PAUL STREULI.
MAX GEIGER.
EDUARD USTERI.

REFERENCES CITED

The following references are of record in the file of this patent:

UNITED STATES PATENTS

| Number | Name | Date |
|---|---|---|
| 2,010,841 | Bender | Aug. 13, 1935 |
| 2,329,074 | Muller | Sept. 7, 1943 |

OTHER REFERENCES

Chattaway et al., "Journal of the Chemical Society," (London) 1934, pages 701–2.

Haller et al., "Jour. Am. Chem. Soc.," vol. 67, page 1593 (1945).

Haller et al., J. A. Chemical Society, Sept. 1945, pages 1591–1593.